US012232195B2

United States Patent
Sato

(10) Patent No.: US 12,232,195 B2
(45) Date of Patent: Feb. 18, 2025

(54) SPECIFIC COMMUNICATION DEVICE, NON-TRANSITORY COMPUTER-READABLE MEDIUM STORING COMPUTER-READABLE INSTRUCTIONS FOR SPECIFIC COMMUNICATION DEVICE AND METHOD

(71) Applicant: BROTHER KOGYO KABUSHIKI KAISHA, Nagoya (JP)

(72) Inventor: Hirokazu Sato, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 232 days.

(21) Appl. No.: 17/825,412

(22) Filed: May 26, 2022

(65) Prior Publication Data

US 2022/0386391 A1     Dec. 1, 2022

(30) Foreign Application Priority Data

May 27, 2021     (JP) ................................. 2021-089232

(51) Int. Cl.
| | |
|---|---|
| *H04W 76/11* | (2018.01) |
| *H04N 1/00* | (2006.01) |
| *H04N 1/327* | (2006.01) |
| *H04W 4/80* | (2018.01) |
| *H04W 8/00* | (2009.01) |

(52) U.S. Cl.
CPC ........ *H04W 76/11* (2018.02); *H04N 1/00204* (2013.01); *H04N 1/00408* (2013.01); *H04N 1/32765* (2013.01); *H04W 4/80* (2018.02); *H04W 8/005* (2013.01); *H04N 2201/0039* (2013.01); *H04N 2201/0055* (2013.01); *H04N 2201/0094* (2013.01)

(58) Field of Classification Search
CPC ....... H04W 76/11; H04W 4/80; H04W 8/005; H04N 1/00204; H04N 1/00408; H04N 1/32765

See application file for complete search history.

(56) References Cited

U.S. PATENT DOCUMENTS

| | | | | |
|---|---|---|---|---|
| 9,826,021 | B2 * | 11/2017 | Watanabe | ............... H04W 4/00 |
| 10,063,993 | B2 * | 8/2018 | Takahashi | ............... H04W 4/80 |

(Continued)

FOREIGN PATENT DOCUMENTS

JP     2017-184169 A     10/2017

*Primary Examiner* — David Bilodeau

(74) *Attorney, Agent, or Firm* — Scully, Scott, Murphy & Presser, P.C.

(57) ABSTRACT

A specific communication device may send specific identification information for identifying the specific communication device to an external via a communication interface, wherein the external device may display a screen including the specific identification information in a case where the external device receives the specific identification information from the specific communication device; and in a case where a specific condition including that the specific identification information is sent to the external is fulfilled, a state of the display unit may be changed from a first state to a second state, the first state being a state in which the display unit does not display the specific identification information, and the second state being a state in which the display unit displays the specific identification information.

20 Claims, 5 Drawing Sheets

(56) References Cited

U.S. PATENT DOCUMENTS

| | | | |
|---|---|---|---|
| 2014/0189815 A1* | 7/2014 | Abe | H04N 23/66 726/4 |
| 2016/0269577 A1* | 9/2016 | Sato | H04W 8/005 |
| 2017/0277479 A1* | 9/2017 | Goto | H04B 17/318 |
| 2017/0289393 A1 | 10/2017 | Yokoyama et al. | |
| 2018/0183974 A1* | 6/2018 | Cao | G06F 3/1229 |
| 2019/0020783 A1 | 1/2019 | Yokoyama et al. | |
| 2020/0186669 A1 | 6/2020 | Yokoyama et al. | |
| 2021/0112177 A1 | 4/2021 | Yokoyama et al. | |

* cited by examiner

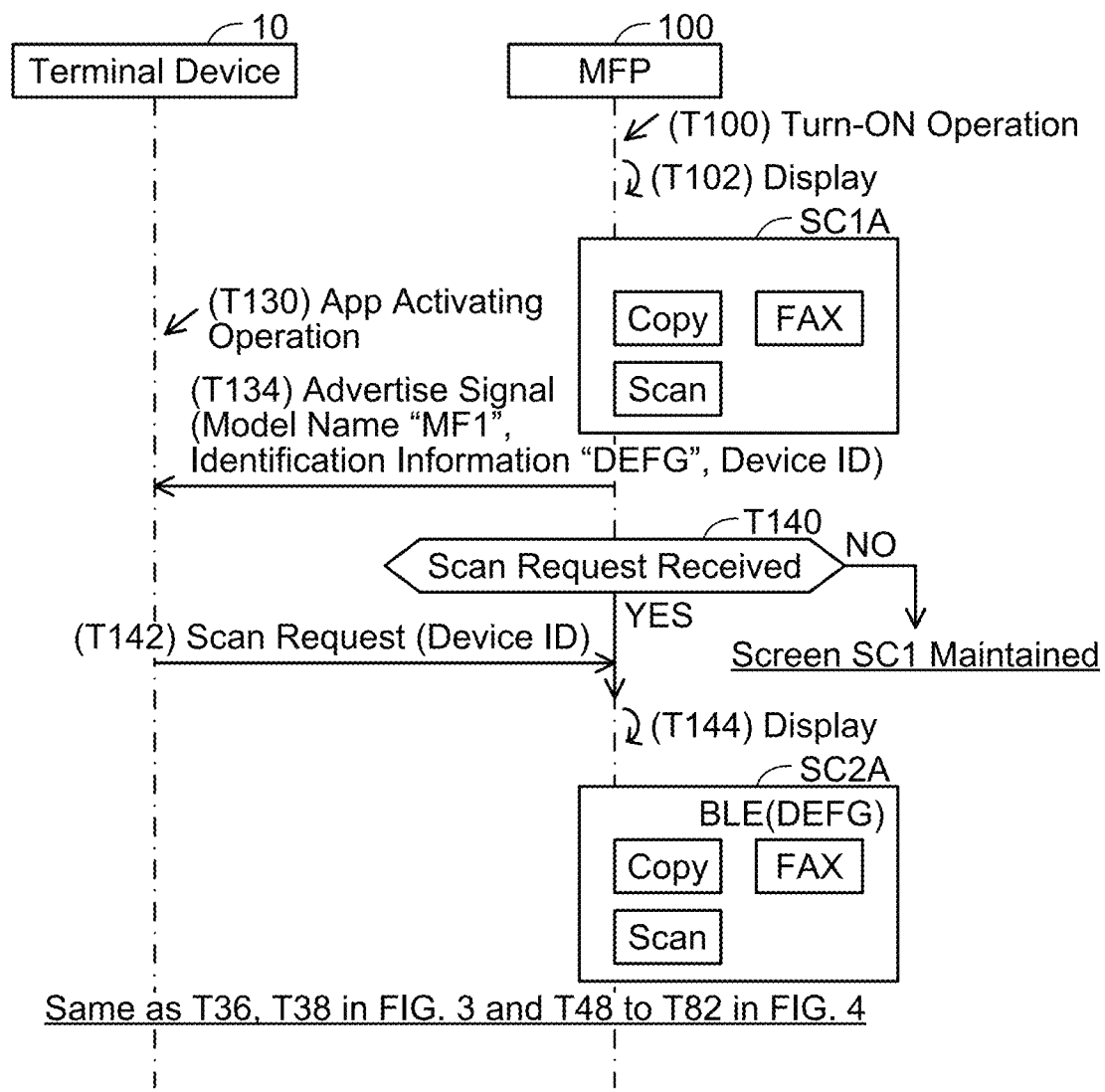

SPECIFIC COMMUNICATION DEVICE, NON-TRANSITORY COMPUTER-READABLE MEDIUM STORING COMPUTER-READABLE INSTRUCTIONS FOR SPECIFIC COMMUNICATION DEVICE AND METHOD

REFERENCE TO RELATED APPLICATIONS

This application claims priority to Japanese Patent Application No. 2021-089232 filed on May 27, 2021, the contents of which are hereby incorporated by reference into the present application.

BACKGROUND

An information processing device receives, from each of a plurality of communication devices, information indicating the communication device (e.g., MAC address, IP address) by using wireless communication according to BLE (Bluetooth ("Bluetooth" is a registered trademark of Bluetooth SIG, Inc) Low Energy). The information processing device displays a list of multiple pieces of information indicating the communication devices (e.g., their IP addresses). A user of the information processing device uses the list to select one of the communication devices.

DESCRIPTION

The user of the information processing device can recognize the existence of the plurality of communication devices by using the list. However, the user may not know which communication device each of the pieces of information in the list indicates.

The disclosure herein provides a technique for informing a user of which communication device among a plurality of communication devices information displayed at an external device indicates.

A specific communication device disclosed herein may comprise:

a communication interface configured to execute wireless communication with an external device;

a display unit; and a controller, wherein the controller may be configured to:

send specific identification information for identifying the specific communication device to an external via the communication interface, wherein the external device displays a screen including the specific identification information in a case where the external device receives the specific identification information from the specific communication device; and in a case where a specific condition including that the specific identification information is sent to the external is fulfilled, change a state of the display unit from a first state to a second state, the first state being a state in which the display unit does not display the specific identification information, and the second state being a state in which the display unit displays the specific identification information.

According to the configuration above, in a situation where there is a plurality of communication devices including the specific communication device, a user sees the specific identification information displayed at the specific communication device and is thereby able to know that the specific identification information displayed at the external device indicates the specific communication device of the plurality of communication devices.

A control method for implementing the specific communication device above, a computer program for implementing the specific communication device above, and a non-transitory computer-readable medium storing computer-readable instructions for implementing the specific communication device above are also novel and useful.

FIG. 5 illustrates a sequence diagram of a process for connecting a multifunctional device to a wireless LAN by using the terminal device.

FIRST EMBODIMENT

Figure 1:
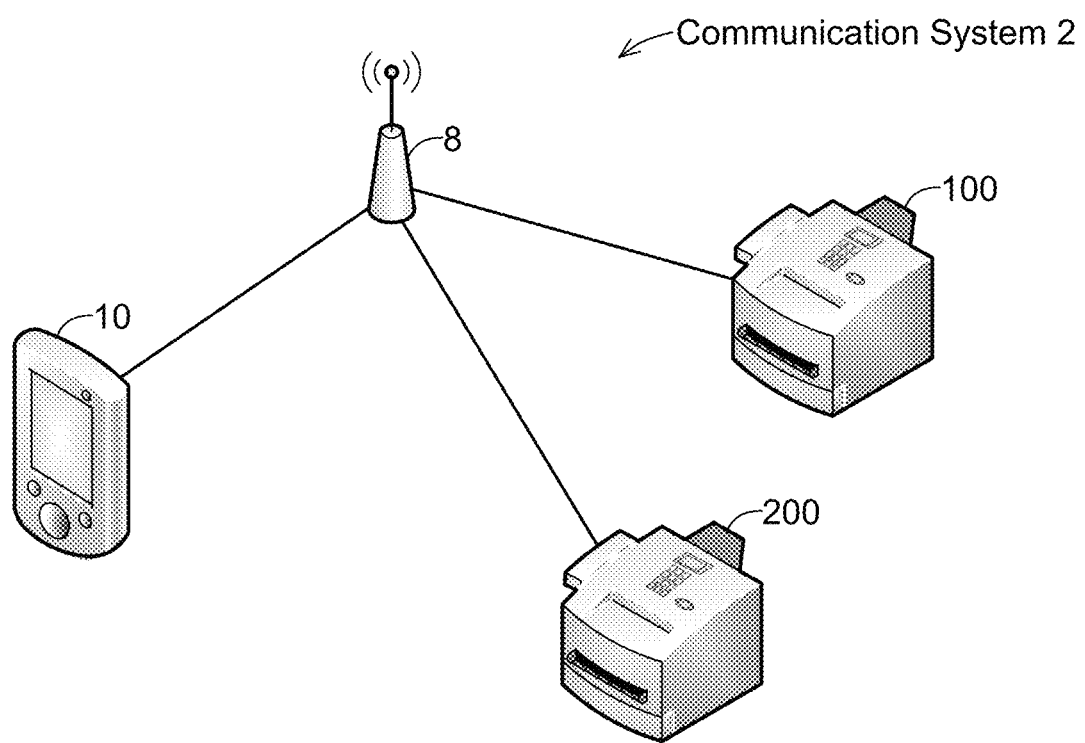
FIG. 1 illustrates a configuration of a communication system.

Configuration of Communication System 2; FIG. 1

As illustrated in FIG. 1, a communication system 2 comprises a terminal device 10, two multifunctional devices 100, 200 (hereinafter, a multifunctional device may be referred to as "MFP (multifunction peripheral)"), and an access point 8 (hereinafter, an access point may be abbreviated as "AP"). The terminal device 10 is a mobile terminal such as a tablet PC, a smartphone, or the like. In a variant, the terminal device 10 may be a terminal device such as a desktop PC, a laptop PC, or the like.

The AP 8 forms a wireless LAN (local area network). The terminal device 10 and an MFP (e.g., 100) can be connected to the wireless LAN formed by the AP 8.

Figure 2:
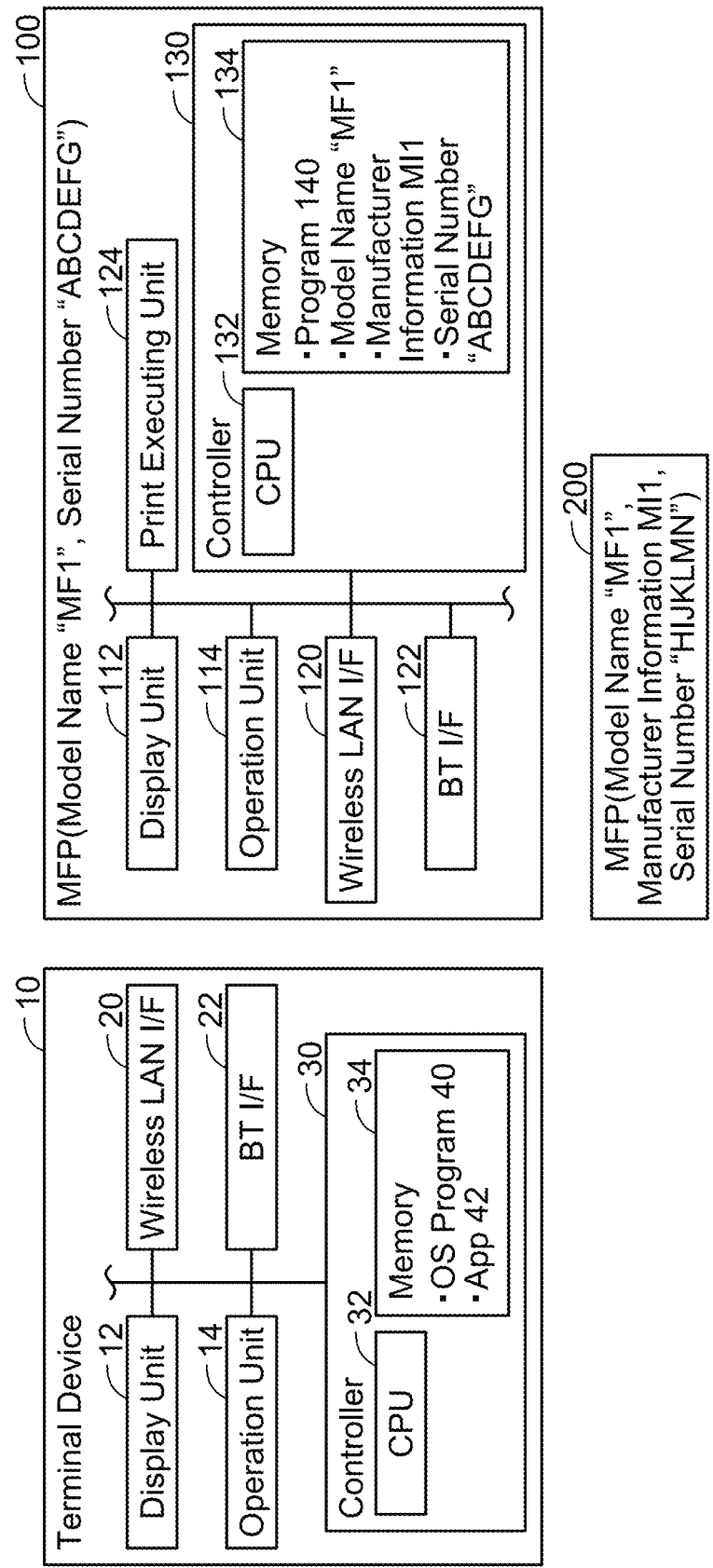
FIG. 2 illustrates a block diagram of a terminal device and multifunctional devices.

Configuration of MFP 100; FIG. 2

The MFP 100 is a peripheral device (e.g., a peripheral device of the terminal device 10) configured to execute multiple functions including a print function, a scan function, and a facsimile function. The MFP 100 comprises a display unit 112, an operation unit 114, a wireless LAN interface 120, a Bluetooth ("Bluetooth" is a registered trademark of Bluetooth SIG, Inc) interface 122, a print executing unit 124, and a controller 130. The units 112 to 130 are connected to a bus line (reference sign omitted). The print executing unit 124 includes a print mechanism of inkjet scheme, laser scheme, or the like. Hereinafter, an interface will be denoted as "I/F" and Bluetooth will be denoted as "BT".

The display unit 112 is a display for displaying various information. The operation unit 114 comprises a plurality of keys. A user can input various instructions to the MFP 100 by operating the operation unit 114. The display unit 112 functions as a touch screen that receives instructions from the user (i.e., as the operation unit 114). In a variant, the display unit 112 may not function as a touch screen.

The wireless LAN I/F 120 is an interface configured to execute communication via a wireless LAN. The communication via a wireless LAN is, for example, communication according to Wi-Fi scheme (hereinafter, referred to as "Wi-Fi communication"). The Wi-Fi scheme is a wireless communication scheme for executing wireless communication according to, for example, 802.11 standard of the IEEE (The Institute of Electrical and Electronics Engineers, Inc.) and standards conforming thereto (e.g., 802.11a, 11b, 11g, 11n, 11ac, etc.).

The BT I/F 122 is an interface configured to execute wireless communication according to BT scheme (hereinafter, referred to as "BT communication"). The BT scheme is a wireless communication scheme based on, for example, 802.15.1 standard of the IEEE and standards conforming thereto. More specifically, the BT I/F 122 supports BLE (Bluetooth Low Energy). The BLE is implemented by version 4.0 or later version of the BT scheme. The BT I/F 122 is configured to execute wireless communication according to the BLE (hereinafter, referred to as "BLE communication").

Here, differences between the Wi-Fi scheme and the BT scheme are listed. The communication speed of the Wi-Fi communication (e.g., the maximum communication speed of 600 Mbps) is faster than the communication speed of the BT communication (e.g., the maximum communication speed of 24 Mbps). The frequency of carrier wave in the Wi-Fi communication is in a 2.4 GHz band or in a 5.0 GHz band. The frequency of carrier wave in the BT communication is 2.4 GHz band. That is, when 5.0 GHz band is used as the frequency of carrier wave in the Wi-Fi communication, the frequency of carrier wave in the Wi-Fi communication is different from the frequency of carrier wave in the BT communication. Further, the maximum distance with which the Wi-Fi communication can be executed (e.g., approximately 100 m) is larger than the maximum distance with which the BT communication can be executed (e.g., approximately a few tens of meters).

The controller 130 comprises a CPU 132 and a memory 134. The CPU 132 executes various processes in accordance with a program 140 stored in the memory 134. The memory 134 is configured of a volatile memory, a nonvolatile memory, etc.

A model name of the MFP 100 is "MF1", and a serial number "ABCDEFG" is assigned to the MFP 100. The model name "MF1" and the serial number "ABCDEF" are stored in the memory 134. Further, manufacturer information MI1 indicating the manufacturer of the MFP 100 is stored in the memory 134.

The MFP 200 is manufactured by the same manufacturer as that of the MFP 100. Further, the MFP 200 is the same model as that of the MFP 100. The MFP 200 comprises a similar configuration to that of the MFP 100. A serial number "HIJKLMN" is assigned to the MFP 200. The model name "MF1", the manufacturer information MIL and the serial number "HIJKLMN" are stored in the MFP 200.

Configuration of Terminal Device 10; FIG. 2

The terminal device 10 comprises a display unit 12, an operation unit 14, a wireless LAN I/F 20, a BT I/F 22, and a controller 30. The units 12 to 30 are connected to a bus line (reference sign omitted).

The display unit 12 is a display for displaying various information. The operation unit 14 is, for example, a touch screen. The operation unit 14 can receive various instructions.

The controller 30 comprises a CPU 32 and a memory 34. The CPU 32 executes various processes in accordance with programs 40, 42 stored in the memory 34. The memory 34 is configured of a volatile memory, a nonvolatile memory, etc. An OS (operating system) program 40 is a program for executing basic processes of the terminal device 10. An application program 42 (hereinafter, referred to as "app 42") is a program for connecting an MFP (e.g., 100) to a wireless LAN.

Figure 3:
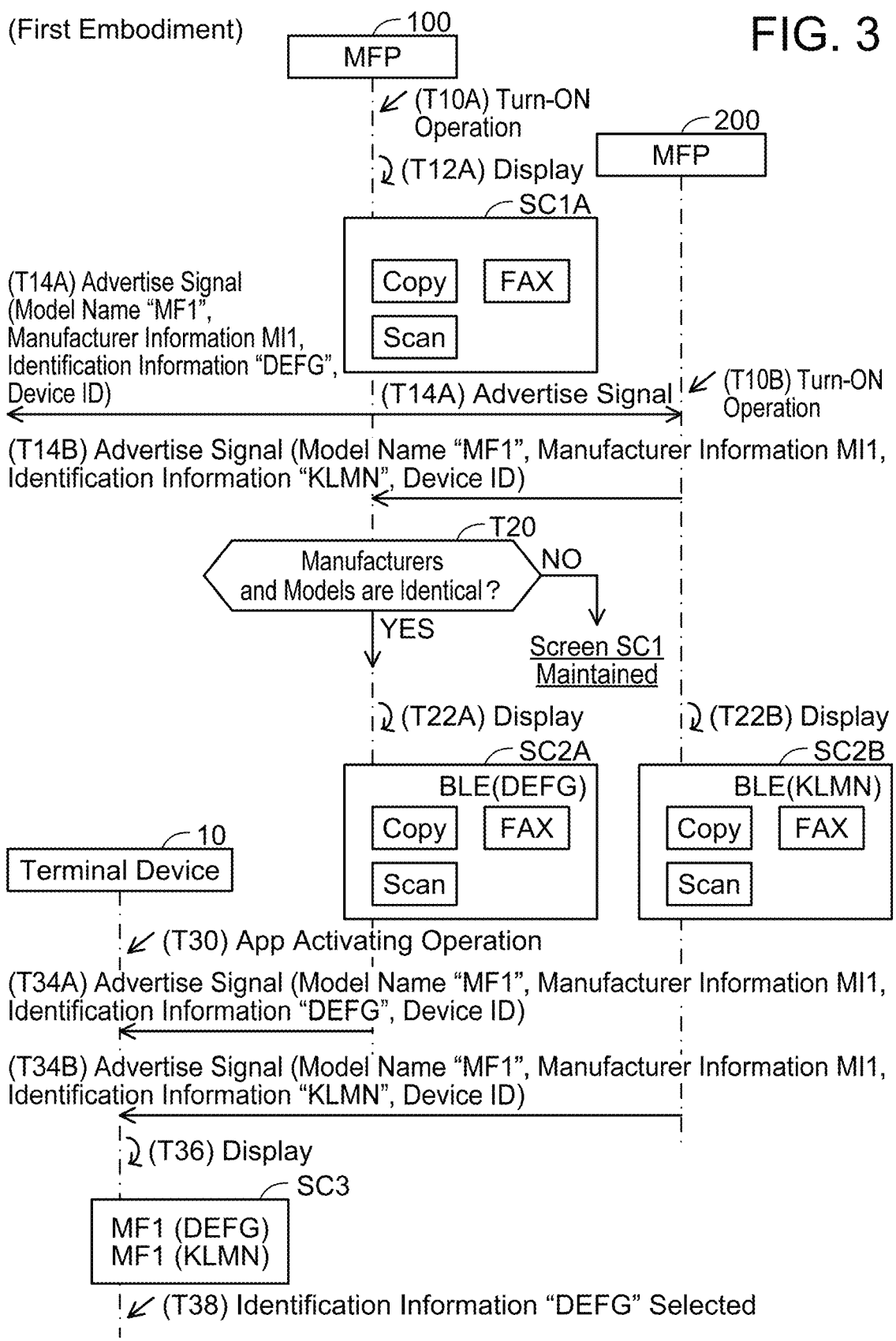
FIG. 3 illustrates a sequence diagram of a process for connecting a multifunctional device to a wireless LAN by using the terminal device.
Figure 4:
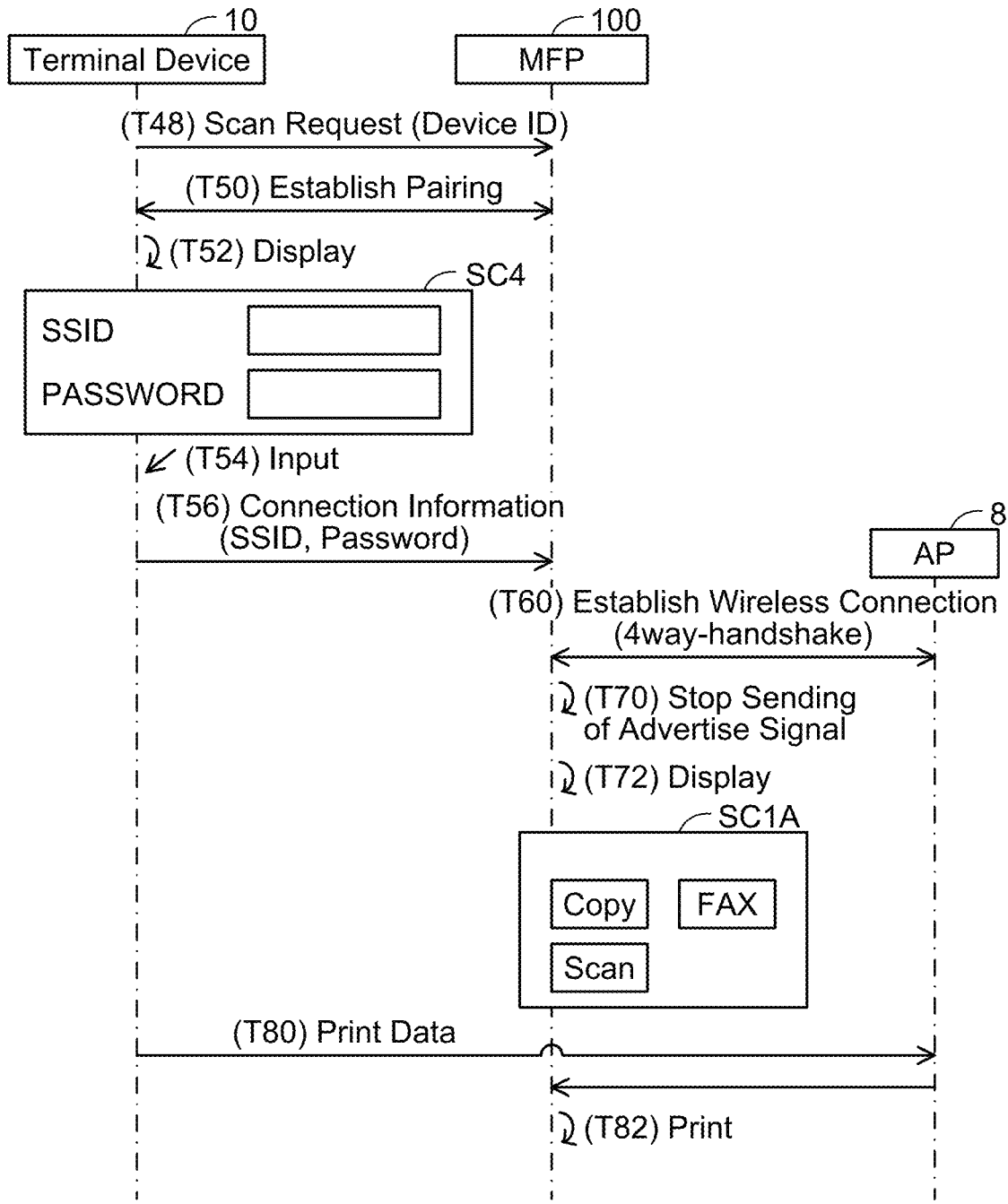
FIG. 4 illustrates a continuation of FIG. 3.

Process for Connecting MFP to Wireless LAN; FIGS. 3, 4

Referring to FIGS. 3 and 4, a process implemented by the communication system 2 is described. Specifically, FIGS. 3 and 4 illustrate a case in which the MFP 100 is connected to the wireless LAN formed by the AP 8 (hereinafter, referred to as "target wireless LAN") by using the terminal device 10. In an initial stage of the present case, the terminal device 10 is already connected to the target wireless LAN. In a variant, the terminal device 10 may not be connected to the target wireless LAN yet. Hereinafter, to assist understanding, processes the CPUs of the devices (e.g., the CPU 132 of the MFP 100, etc.) execute will be described with the devices (e.g., the MFP 100, etc.) as the subjects of actions, not with the CPUs as the subjects of actions.

The present case assumes that the MFPs 100, 200 are newly installed in a predetermined area (e.g., an office). After the installation of the MFP 100, the user operates the operation unit 114 of the MFP 100 to turn on the MFP 100 in T10A.

When receiving the turn-on operation from the user in T10A, the MFP 100 displays an operation screen SC1A on the display unit 112 in T12A. The operation screen SC1A includes buttons for receiving execution instructions for the various functions of the MFP 100 (e.g., copy, scan, etc.).

In T14A, the MFP 100 starts to send an Advertise signal according to the BLE by broadcast via the BT I/F 122. This Advertise signal includes the model name "MF1" of the MFP 100, the manufacturer information MI1, identification information "DEFG", and a device ID for identifying the BT I/F 122. The identification information "DEFG" is the last four characters of the serial number "ABCDEFG" of the MFP 100 and is information for identifying the MFP 100. In a variant, the identification information is not limited to the last four characters of the serial number "ABCDEFG", and may be a different part of the serial number "ABCDEFG" (e.g., the last three characters, the first four characters, four characters in the middle, four characters selected randomly from the serial number "ABCDEFG", etc.).

After the installation of the MFP 200, the user operates the operation unit (reference sigh omitted) of the MFP 200 to turn on the MFP 200 in T10B. The MFP 200 starts to send an Advertise signal by broadcast in T14B. This Advertise signal includes the model name "MF1" of the MFP 200, the manufacturer information MI1, identification information "KLMN", and a device ID for identifying the BT I/F of the MFP 200. The identification information "KLMN" is the last four characters of the serial number "HIJKLMN" of the MFP 200.

After the MFP 200 has been turned on, the MFP 100 receives the Advertise signal from the MFP 200 via the BT I/F 122 in T14B. In the present embodiment, the MFP 100 executes step T20 and the subsequent steps with receipt of an Advertise signal from another MFP (e.g., the MFP 200) as a trigger. In other words, the MFP 100 does not execute step T20 and the subsequent steps before receiving an Advertise signal from another MFP.

In T20, the MFP 100 determines whether the Advertise signal from the other MFP includes both of the model name same as the model name "MF1" of the MFP 100 and the manufacturer information same as the manufacturer information MI1 of the MFP 100, or not. In the present case, the MFP 100 determines that the Advertise signal from the MFP 200 includes both of the model name same as the model name "MF1" of the MFP 100 and the manufacturer information same as the manufacturer information MI1 of the MFP 100 (YES in T20), and proceeds to T22A.

In T22A, the MFP 100 displays an operation screen SC2A on the display unit 112 instead of the operation screen SC1A (T12A). The operation screen SC2A is the same as the operation screen SC1A, except that it includes the identification information "DEFG" at an upper right portion of the screen.

When the other MFP is a device different from the MFP 200 (e.g., an MFP of a different model), the MFP 100 determines that the Advertise signal from the other MFP does not include at least one of the model name same as the model name "MF1" of the MFP 100 and the manufacturer information same as the manufacturer information MI1 of the MFP 100 (NO in T20). In this case, the MFP 100 does not execute step T22A. That is, the MFP 100 maintains the display of the operation screen SC1A.

In the present case, the MFP 200 receives from the MFP 100 the Advertise signal including the model name "MF1" and the manufacturer information MI1 of the MFP 100 (T14A). As with the MFP 100, the MFP 200 executes the determination of T20 with the receipt of the Advertise signal from the MFP 100 as a trigger. In the present case, the MFP 200 determines that the Advertise signal from the MFP 100 includes both of the model name same as the model name "MF1" of the MFP 200 and the manufacturer information same as the manufacturer information MI1 of the MFP 200, and proceeds to T22B.

In T22B, the MFP 200 displays an operation screen SC2B on its display unit. The operation screen SC2B is the same as the operation screen SC1A, except that it includes the identification information "KLMN" at an upper right portion of the screen. In the present case, in the situation where the two MFPs 100, 200 of the same model are installed in the predetermined area, the identification information "DEFG" is displayed at the MFP 100 and the identification information "KLMN" is displayed at the other MFP 200.

In T30, the user inputs an activation instruction for the app 42 to the operation unit 14 of the terminal device 10. As a result, the terminal device 10 activates the app 42.

As described, the MFPs 100 and 200 start to send the Advertise signals in T14A and T14B, respectively. In the present case, the terminal device 10 receives the Advertise signals from the MFPs 100 and 200 in T34A and T34B, respectively, after having activated the app 42.

In subsequent T36, the terminal device 10 displays a selection screen SC3 on the display unit 12. The selection screen SC3 is a screen for selecting a target device to be connected to the target wireless LAN. The selection screen SC3 includes a list of information included in the Advertise signals received in T34A and T34B. In the present case, this list includes a combination of the model name "MF1" and the identification information "DEFG" and a combination of the model name "MF1" and the identification information "KLMN".

The user sees the screens of the MFPs 100, 200 to determine a target device to be connected to the target wireless LAN. In the present case, the user selects the MFP 100 as the target device. The user can find that identification information for identifying the MFP 100 is the identification information "DEFG" by seeing the operation screen SC2A at the MFP 100. Then, the user sees the selection screen SC3 at the terminal device 10 and can recognize that the identification information "DEFG" in the list indicates the MFP 100 of the two MFPs 100, 200.

For example, a comparative example can be considered in which only the selection screen SC3 is displayed but the identification information "DEFG", "KLMN" are not displayed at the MFPs 100, 200. In this comparative example, although the selection screen SC3 includes the identification information "DEFG", "KLMN", the user may not know which of the MFPs 100 and 200 each of the identification information "DEFG" and "KLMN" indicates. To the contrary, in the present embodiment, the identification information "DEFG" and "KLMN" are displayed at the MFPs 100 and 200 (T22A, T22B). Thus, the user can recognize which of the MFPs 100 and 200 is indicated by each of the identification information "DEFG" and "KLMN" displayed at the terminal device 10.

In T38, the terminal device 10 receives, from the user, a selection of the identification information "DEFG" in the selection screen SC3 via the operation unit 14.

In subsequent T48 in FIG. 4, the terminal device 10 sends a Scan request according to the BLE by unicast, with the device ID of the MFP 100 as its destination, to the MFP 100 identified by the identification information "DEFG" selected in T38. In response to this, the MFP 100 sends a Scan response for the Scan request to the terminal device 10, and then a paring is established between the terminal device 10 and the MFP 100 in T50.

When the pairing with the MFP 100 is established in T50, the terminal device 10 displays an input screen SC4 on the display unit 12 in T52. The input screen SC4 includes entry fields to which connection information for connection to the target wireless LAN (i.e., an SSID (service set identifier) and a password) is inputted.

When the terminal device 10 receives an input operation of the connection information in the input screen SC4 via the operation unit 14 in T54, the terminal device 10 sends in T56 the connection information inputted in T54 to the MFP 100 via the BT I/F 22 by using the pairing established in T50.

When receiving the connection information from the terminal device 10 in T56 via the BT I/F 122 by using the pairing of T50, the MFP 100 executes 4way-handshake communication with the AP 8 in T60 via the wireless LAN I/F 120 by using the received connection information. As a result, a wireless connection via the wireless LAN I/F 120 is established between the MFP 100 and the AP 8. That is, the MFP 100 is connected to the target wireless LAN formed by the AP 8.

In subsequent T70, the MFP 100 stops sending the Advertise signal. In the present embodiment, the Advertise signal is used for connection to the wireless LAN. This configuration can prevent the Advertise signal from unnecessarily being sent continuously after the completion of the connection to the wireless LAN.

In T72, the MFP 100 displays the operation screen SC1A, which is the same as the one in T12A of FIG. 3, on the display unit 112, instead of the operation screen SC2A (see T22A in FIG. 3). As described, the identification information "DEFG" in the operation screen SC2A is used to inform the user that the identification information "DEFG" displayed at the terminal device 10 indicates the MFP 100 and connect the MFP 100 to the wireless LAN. The configuration above can prevent the display of the identification information "DEFG" from being maintained unnecessarily after the completion of the connection to the wireless LAN.

In the present embodiment, the display of the operation screen SC2A is maintained until the sending of the Advertise signal is stopped. That is, while the sending of the Advertise signal continues after the operation screen SC2A has been displayed, the display of the identification information "DEFG" in the operation screen SC2A is maintained. For example, a comparative example can be considered in which the operation screen SC1A is displayed instead of the operation screen SC2A after a predetermined period of time elapses even while the sending of the Advertise signal continues. In this comparative example, an event may occur where the identification information "DEFG" is being displayed at the terminal device 10 but the identification information "DEFG" is not being displayed at the MFP 100. The configuration of the present embodiment can prevent occurrence of the event. In a variant, the configuration of the comparative example above may be employed.

In the present case, the terminal device 10 sends print data to the MFP 100 via the wireless LAN I/F 20 and the AP 8 in T80. The MFP 100 receives in T80 the print data from the terminal device 10 via the wireless LAN I/F 120 and the AP 8 by using the wireless connection established in T60. Then, the MFP 100 causes the print executing unit 124 to print an image represented by the received print data in T82. In a variant, the MFP 100 may receive an execution request for another function, such as scan, from the terminal device 10 by using the wireless connection established in T60.

Effects of Present Embodiment

In the present embodiment, the MFP 100 displays the operation screen SC2A including its own identification information "DEFG" (T22A in FIG. 3) with the receipt of an Advertise signal from another MFP (e.g., the MFP 200) as the trigger. For example, a comparative example can be considered in which the operation screen SC2A is displayed without the receipt of an Advertise signal from another MFP. In this comparative example, the operation screen SC2A is displayed even though only the MFP 100 is installed in the predetermined area. In the situation where only the MFP 100 is installed in the predetermined area, the user can presume that the identification information "DEFG" in the selection screen SC3 at the terminal device 10 indicates the MFP 100 without knowing that the identification information "DEFG" indicates the MFP 100. According to the present embodiment, in such a situation, unnecessary display of the operation screen SC2A including the identification information "DEFG" can be prevented.

Further, in the present embodiment, the MFP 100 does not display the operation screen SC2A in the case where an Advertise signal from another MFP does not include the manufacturer information same as the manufacturer information MI1 of the MFP 100 (NO in T20). That is, the MFP 100 does not display the operation screen SC2A in the case where the manufacturer of the other MFP is different from the manufacturer of the MFP 100. Generally, products from different manufacturers have different appearances and different model names. Thus, the user can distinguish between the MFP 100 and the other MFP by their model names in the selection screen SC3. According to the present embodiment, in the case where the manufacturer of the other MFP is different from that of the MFP 100, unnecessary display of the operation screen SC2A including the identification information "DEFG" can be prevented.

Further, in the present embodiment, the MFP 100 does not display the operation screen SC2A in the case where an Advertise signal from another MFP does not include the model name same as the model name "MF1" of the MFP 100 (NO in T20). That is, the MFP 100 does not display the operation screen SC2A in the case where the other MFP is of a different model from the model of the model name "MF1". When the other MFP is of a different model, the selection screen SC3 at the terminal device 10 includes not only the model name "MF1" but also the model name of the other MFP. Generally, model names are written on housings of MFPs, packages, and/or the like. Thus, the user is highly likely to recognize which of the MFP 100 and the other MFP each of the two model names in the selection screen SC3 indicates. That is, the user can distinguish between the MFP 100 and the other MFP by the two model names in the selection screen SC3 without the identification information of the MFPs being displayed. According to the present embodiment, in the case where the other MFP is of a different model from that of the MFP 100, unnecessary display of the operation screen SC2A including the identification information "DEFG" can be prevented.

For example, a comparative example can be considered in which the identification information included in the Advertise signal and the identification information included in the operation screen SC2A are the same as the serial number "ABCDEFG". In this comparative example, a third party different from the user may find out the whole serial number "ABCDEFG". Further, the serial number is a relatively long character string and thus has lower visual recognizability compared to a short character string. According to the configuration of the present embodiment, it is possible to prevent the third party from finding out the whole serial number "ABCDEFG" since the identification information "DEFG", which is a part of the serial number "ABCDEFG", is used. Further, it is possible to prevent low visual recognizability since the identification information "DEFG", which is a short character string, is used. In a variant, the configuration of the comparative example above can be employed.

Correspondence Relationships

The MFP 100, the BT I/F 122, the display unit 112, and the identification information "DEFG" are examples of "specific communication device", "communication interface", "display unit", and "specific identification information", respectively. The MFP 200 and the identification information "KLMN" are examples of "other communication device" and "other identification information", respectively. The AP 8 is an example of "access point". The terminal device 10 is an example of "external device". The state where the operation screen SC1A is being displayed in T12A in FIG. 3, the state where the operation screen SC2A is being displayed in T22A in FIG. 3, and the state where the operation screen SC1A is being displayed in T72 in FIG. 4 are examples of "first state", "second state", and "third state", respectively. The manufacturer information MI1 and the model name "MF1" are examples of "manufacturer information" and "model information", respectively. Determining YES in T20 in FIG. 3 is an example of "specific condition".

T14A and T22A in FIG. 3 are examples of "send specific identification information" and "change a state of the display unit from a first state to a second state", respectively.

SECOND EMBODIMENT

The present embodiment is different from the first embodiment in the timing when the operation screen SC2A is displayed. A communication system 2 according to the second embodiment has the same configuration as that of the first embodiment.

Process for Connecting MFP to Wireless LAN;
FIG. 5

T100, T102, T130, and T134 are the same as T10A, T12A, T30, and T34A in FIG. 3. Unlike the first embodiment, an app 42 according to the present embodiment is configured to send, in response to receipt of an Advertise signal after the app 42 has been activated, a Scan request to the sender of the Advertise signal. In other words, the app 42 according to the present embodiment is configured to send the Scan request to the sender of the Advertise signal before a selection is performed in the selection screen SC3 (see T36 in FIG. 3).

The MFP 100 starts to send an Advertise signal in T134, and monitors whether a Scan request is received from an external via the BT I/F 122 in T140. The MFP 100 maintains the display of the operation screen SC1A until a Scan request is received from an external.

In the case where a Scan request is received from an external (YES in T140, T142), the MFP 100 displays the operation screen SC2A on the display unit 112 in T144. After T144, the same steps as T36, T38 in FIGS. 3 and T48 to T82 in FIG. 4 are executed.

Effects of Present Embodiment

For example, in the case where the app 42 is not activated yet, the terminal device 10 does not send a Scan request even when receiving the Advertise signal. Further, for example, in the case where the terminal device 10 is located far from the MFP 100, the terminal device 10 cannot receive the Advertise signal and thus does not send a Scan request. In the case where the app 42 is not activated or the terminal device 10 is located far from the MFP 100, the probability that the process for connecting the MFP 100 to the target wireless LAN is executed is presumably low. In the present embodiment, the display of the operation screen SC1A is maintained (NO in T140) until a Scan request is received from an external. According to the present embodiment, unnecessary display of the operation screen SC2A including the identification information "DEFG" can be prevented in the case where the probability that the process for connecting the MFP 100 to the target wireless LAN is executed is presumably low. The Scan request is an example of "predetermined signal".

(Variant 1) The "specific communication device" is not limited to the MFP 100, and may be a printer, a scanner, a FAX machine, a desktop PC, a laptop PC, or the like.

(Variant 2) The "communication interface" is not limited to the BT I/F 122, and may be, for example, the wireless LAN I/F 120. In a variant where the "communication interface" is the wireless LAN I/F 120, the MFP 100 may send a beacon signal including the identification information "DEFG" to an external by broadcast via the wireless LAN I/F 120.

(Variant 3) The "specific identification information" is not limited to a part of the serial number, and may be, for example, another information different from the serial number (e.g., a printer name, at least a part of an IP address, etc.).

(Variant 4) The act of "send specific identification information for identifying the specific communication device to an external" is not limited to sending an Advertise signal including identification information, and may be, for example, sending another signal (e.g., a Scan request) including identification information according to the BT scheme.

(Variant 5) Before the operation screen SC2A is displayed on the display unit 112, no screens may be displayed on the display unit 112. In the present variant, the state where no screens are displayed on the display unit 112 is an example of "first state".

(Variant 6) In the first embodiment above, the MFP 100 executes the determination of T20 in FIG. 3 with the receipt of an Advertise signal from another MFP as the trigger, and then displays the operation screen SC2A. Instead of this, the MFP 100 may display the operation screen SC2A with the MFP 100 starting to send the Advertise signal as the trigger, without the receipt of an Advertise signal from another MFP. In the present variant, "receive manufacturer information indicating a manufacturer of other communication device from the other communication device" can be omitted.

(Variant 7) The determination of T20 in FIG. 3 may not be executed. Further, in T20 of FIG. 3, only one of the determination whether the Advertise signal includes the same model name and the determination whether the Advertise signal includes the same manufacturer information may be executed. In these variants, at least one of "manufacturer information" and "model information" can be omitted.

(Variant 8) The "manufacturer information" is not limited to the manufacturer information MI1, and may be, for example, a part of character string of model name, a part of model number, or the like.

(Variant 9) Steps T54 to T82 in FIG. 4 may not be executed. In this case, the MFP 100 may send information indicating a state of the MFP 100 (e.g., ink remaining amount, etc.) to the terminal device 10 by using the pairing of T50. In the present variant, "receive connection information" and "establish the wireless connection" can be omitted.

(Variant 10) Step T72 in FIG. 4 may not be executed. In the present variant, "change the state of the display unit from the second state to a third state" can be omitted.

(Variant 11) Step T70 in FIG. 4 may no be executed. In the present variant, "stop sending the specific identification information to the external" can be omitted.

(Variant 12) In T72 of FIG. 4, the MFP 100 may delete the operation screen SC2A and display no screens. In the present variant, the state where no screens are displayed is an example of "third state".

(Variant 13) In the embodiments above, the processes of FIGS. 3 to 5 are implemented by software (e.g., the programs 40, 42, 140, etc.), however, at least one of these processes may be implemented by hardware such as a logic circuit, etc.

What is claimed is:

1. A specific communication device, wherein the specific communication device is a printer and/or a scanner, and the specific communication device comprises:
   a communication interface configured to execute wireless communication with terminal device;
   a display unit; and
   a controller configured to:
   send specific identification information for identifying the specific communication device to the terminal device via the communication interface, wherein the terminal device displays a screen including the specific identification information in a case where the terminal device receives the specific identification information from the specific communication device;
   receive model information indicating a model of another specific communication device from the another specific communication device via the communication interface; and
   in a case where a specific condition at least including that the specific identification information is sent to the terminal device and the model indicated by the received model information is identical to a model of the specific communication device is fulfilled, change a state of the display unit from a first state to a second state, the first state being a state in which the display unit does not display the specific identification information for identifying the specific communication device itself, and the second state being a state in which the display unit displays the specific identification information for identifying the specific communication device itself, wherein the state of the display unit is maintained in the first state in a case where the specific condition is not fulfilled due to the model indicated by the received model information being not identical to the model of the specific communication device.

2. The specific communication device as in claim 1, wherein
the first state is a state in which the display unit is displaying a screen that does not include the specific identification information, and
the second state is a state in which the display unit is displaying a screen that includes the specific identification information.

3. The specific communication device as in claim 1, wherein
the communication interface is an interface for executing the wireless communication according to Bluetooth (registered trademark), and
the controller is configured to send the specific identification information to the terminal device by sending an Advertise signal according to the Bluetooth including the specific identification information.

4. The specific communication device as in claim 1, wherein
the another specific communication device is a printer and/or a scanner and the model information is received with another identification information identifying the another specific communication device, and
the state of the display unit is maintained in the first state until the another identification information and the model information is received from the another specific communication device via the communication interface.

5. The specific communication device as in claim 1, wherein
the controller is further configured to receive manufacturer information indicating a manufacturer of the another specific communication device which is a printer and/or a scanner from the another specific communication device via the communication interface,
the specific condition further includes that the manufacturer indicated by the received manufacturer information is identical to a manufacturer of the specific communication device, and
the state of the display unit is maintained in the first state in a case where the specific condition is not fulfilled due to the manufacturer indicated by the received manufacturer information being not identical to the manufacturer of the specific communication device.

6. The specific communication device as in claim 5, wherein
the state of the display unit is changed to the second state in a case where the model indicated by the received model information is identical to the model of the specific communication device and the manufacturer indicated by the received manufacturer information is identical to the manufacturer of the specific communication device and the specific identification information is sent to the terminal device.

7. The specific communication device as in claim 1, wherein the specific identification information is at least a part of a serial number of the specific communication device.

8. The specific communication device as in claim 1, wherein
the controller is further configured to:
after the terminal device has received the specific identification information from the specific communication device, receive connection information for establishing a wireless connection with an access point from the terminal device via the communication interface; and
in a case where the connection information is received from the terminal device, establish the wireless connection with the access point by using the connection information.

9. The specific communication device as in claim 8, wherein
the controller is further configured to, in a case where the wireless connection is established with the access point, change the state of the display unit from the second state to a third state, the third state being a state in which the display unit does not display the specific identification information.

10. The specific communication device as in claim 8, wherein
the controller is configured to continue sending the specific identification information to the terminal device until the wireless connection is established with the access point, and
the controller is further configured to, in a case where the wireless connection is established with the access point, stop sending the specific identification information to the terminal device.

11. The specific communication device as in claim 1, wherein
the state of the display unit is maintained in the second state while sending of the specific identification information to the terminal device is continued after the state of the display unit has been changed from the first state to the second state.

12. The specific communication device as in claim 1, wherein
the specific condition further includes that the specific communication device receives a predetermined signal from the terminal device via the communication interface after the specific identification information has been sent to the terminal device, and
the state of the display unit is maintained in the first state until the predetermined signal is received from the terminal device via the communication interface.

13. A non-transitory computer-readable recording medium storing computer-readable instructions for a specific communication device, wherein
the specific communication device is a printer and/or or scanner and the specific communication device comprises:
a communication interface configured to execute wireless communication with an terminal device;
a display unit; and
a processor,
wherein
the computer-readable instructions, when executed by the processor, cause the specific communication device to:
send specific identification information for identifying the specific communication device to the terminal device via the communication interface, wherein the terminal device displays a screen including the specific identification information in a case where the terminal device receives the specific identification information from the specific communication device;

cause the specific communication device to receive model information indicating a model of another specific communication device which is a printer and/or a scanner from the another specific communication device via the communication interface; and in a case where a specific condition at least including that the specific identification information is sent to the terminal device and the model indicated by the received model information is identical to a model of the specific communication device is fulfilled, change a state of the display unit from a first state to a second state, the first state being a state in which the display unit does not display the specific identification information for identifying the specific communication device itself, and the second state being a state in which the display unit displays the specific identification information for identifying the specific communication device itself, wherein the state of the display unit is maintained in the first state in a case where the specific condition is not fulfilled due to the model indicated by the received model information being not identical to the model of the specific communication device.

14. The non-transitory computer-readable recording medium as in claim 13, wherein the first state is a state in which the display unit is displaying a screen that does not include the specific identification information, and the second state is a state in which the display unit is displaying a screen that includes the specific identification information.

15. The non-transitory computer-readable recording medium as in claim 13, wherein the communication interface is an interface for executing the wireless communication according to Bluetooth (registered trademark), and the specific identification information is sent to the terminal device by sending an Advertise signal according to the Bluetooth including the specific identification information.

16. The non-transitory computer-readable recording medium as in claim 13, wherein the model information is received with another identification information for identifying the another specific communication device, and the state of the display unit is maintained in the first state until the another identification information and the model information is received from the another specific communication device via the communication interface.

17. The non-transitory computer-readable recording medium as in claim 13, wherein the computer-readable instructions, when executed by the processor, further cause the specific communication device to receive manufacturer information indicating a manufacturer of the another specific communication device from the another specific communication device via the communication interface, the specific condition further includes that the manufacturer indicated by the received manufacturer information is identical to a manufacturer of the specific communication device, and the state of the display unit is maintained in the first state in a case where the specific condition is not fulfilled due to the manufacturer indicated by the received manufacturer information being not identical to the manufacturer of the specific communication device.

18. The non-transitory computer-readable recording medium as in claim 17, wherein the state of the display unit is changed to the second state in a case where the model indicated by the received model information is identical to the model of the specific communication device and the manufacturer indicated by the received manufacturer information is identical to the manufacturer of the specific communication device and the specific identification information is sent to the terminal device.

19. The non-transitory computer-readable recording medium as in claim 13, wherein the specific identification information is at least a part of a serial number of the specific communication device.

20. A control method comprising:

sending specific identification information for identifying a specific communication device which is a printer and/or a scanner to a terminal device via a communication interface configured to execute wireless communication with the terminal device, wherein the terminal device displays a screen including the specific identification information in a case where the terminal device receives the specific identification information from the specific communication device;

receiving model information indicating a model of another specific communication device from the another specific communication device via the communication interface; and in a case where a specific condition at least including that the specific identification information is sent to the terminal device and the model indicated by the received model information is identical to a model of the specific communication device is fulfilled, changing a state of a display unit of the specific communication device from a first state to a second state, the first state being a state in which the display unit does not display the specific identification information for identifying the specific communication device itself, and the second state being a state in which the display unit displays the specific identification information for identifying the specific communication device itself, wherein the state of the display unit is maintained in the first state in a case where the specific condition is not fulfilled due to the model indicated by the received model information being not identical to the model of the specific communication device.

* * * * *